Dec. 28, 1943.  F. E. HAND  2,337,749
TRACTOR-MOUNTED IMPLEMENT
Filed Nov. 8, 1941   3 Sheets-Sheet 1

Inventor:
Frederick E. Hand.
By Paul Q. Pippel Atty.

Dec. 28, 1943.　　　F. E. HAND　　　2,337,749
TRACTOR-MOUNTED IMPLEMENT
Filed Nov. 8, 1941　　　3 Sheets-Sheet 3
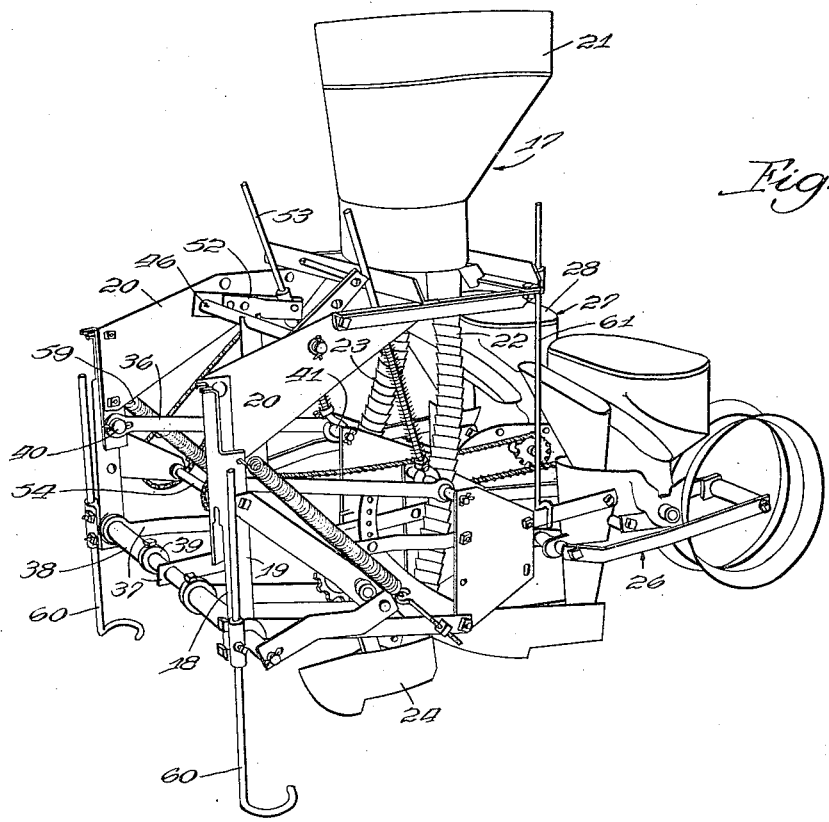
Fig. 3.
Fig. 4.
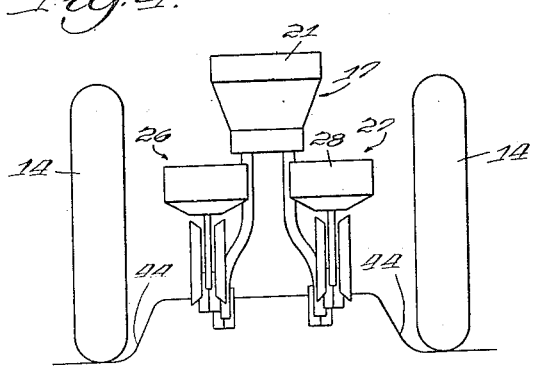
Inventor:
Frederick E. Hand.
By Paul Q. Pippel.
Atty.

Patented Dec. 28, 1943

2,337,749

UNITED STATES PATENT OFFICE 2,337,749

TRACTOR-MOUNTED IMPLEMENT

Frederick E. Hand, Canton, Ill., assignor to International Harvester Company, a corporation of New Jersey Application November 8, 1941, Serial No. 418,393

7 Claims. (Cl. 111—59)

This invention relates to tractor-mounted implements and, more particularly, to fertilizing and planting implements.

It is an object of the present invention to provide a combined fertilizing and planting implement which can be attached to a tractor or other implement-supporting means as a unit.

It is another object of the invention to provide a combined fertilizing and planting implement, particularly adapted for the planting of beans and the like in sections of the country where the planting is done on previously prepared beds which are from 11 to 15 inches above the water source.

It is another object of the invention to provide in a ground-working implement, such as a planter, means for vertically adjusting the rig or frame which carries the ground-working tool or furrow opener, with respect to means for connecting the same to a supporting frame or to the tractor for vertical movement with respect thereto.

According to the present invention, the tractor is provided with attaching portions on its rear axle structure to which a combined fertilizing and planting implement may be connected as a unit by means provided on its supporting frame adapted for quick attachment to the attaching portions of the rear axle structure of the tractor. The supporting frame of the implement carries a fertilizer hopper structure, immediately below which is located a planting structure adapted to have movement relative to the supporting frame and to the tractor and which carries the fertilizer spout adapted to receive fertilizer from the fertilizer hopper structure. The fertilizer hopper structure, when the implement is attached to the tractor, is located centrally of the tractor and delivers fertilizer to fertilizer spouts located respectively upon planting structures at opposite sides of the fertilizer hopper structure. The planting structures are connected to the supporting frame for free vertical movement by means of parallel links, and the connection of the frame which carries the planter furrow opener with the parallel links is such that the same is vertically adjustable with respect to the parallel link-connecting means. An auxiliary lifting means forms a part of the supporting frame, and there is also provided an auxiliary drive shaft on the supporting frame for driving both the fertilizing and planting structures. The fertilizer and hopper structures with the accompanying auxiliary lifting means and auxiliary drive shaft are attached to the tractor as a unit and, after the attachment to the tractor, it is only necessary to make the connection of the auxiliary lifing means with the power device on the tractor and of the auxiliary driving shaft with the power take-off driving means on the rear axle of the tractor.

For a better understanding of the invention, reference may be had to the following detailed description taken in connection with the accompanying drawings, in which.

Figure 3 is a perspective view in elevation of the combined fertilizer and planting implement unattached from the tractor; and Figure 4 is a diagrammatic rear view of a portion of the tractor and of the implement indicating the relative position of the fertilizer and planting hopper structure with respect to each other, their position when planting on a previously prepared bed and their location with respect to the rear wheels of the tractor.

Figure 1:
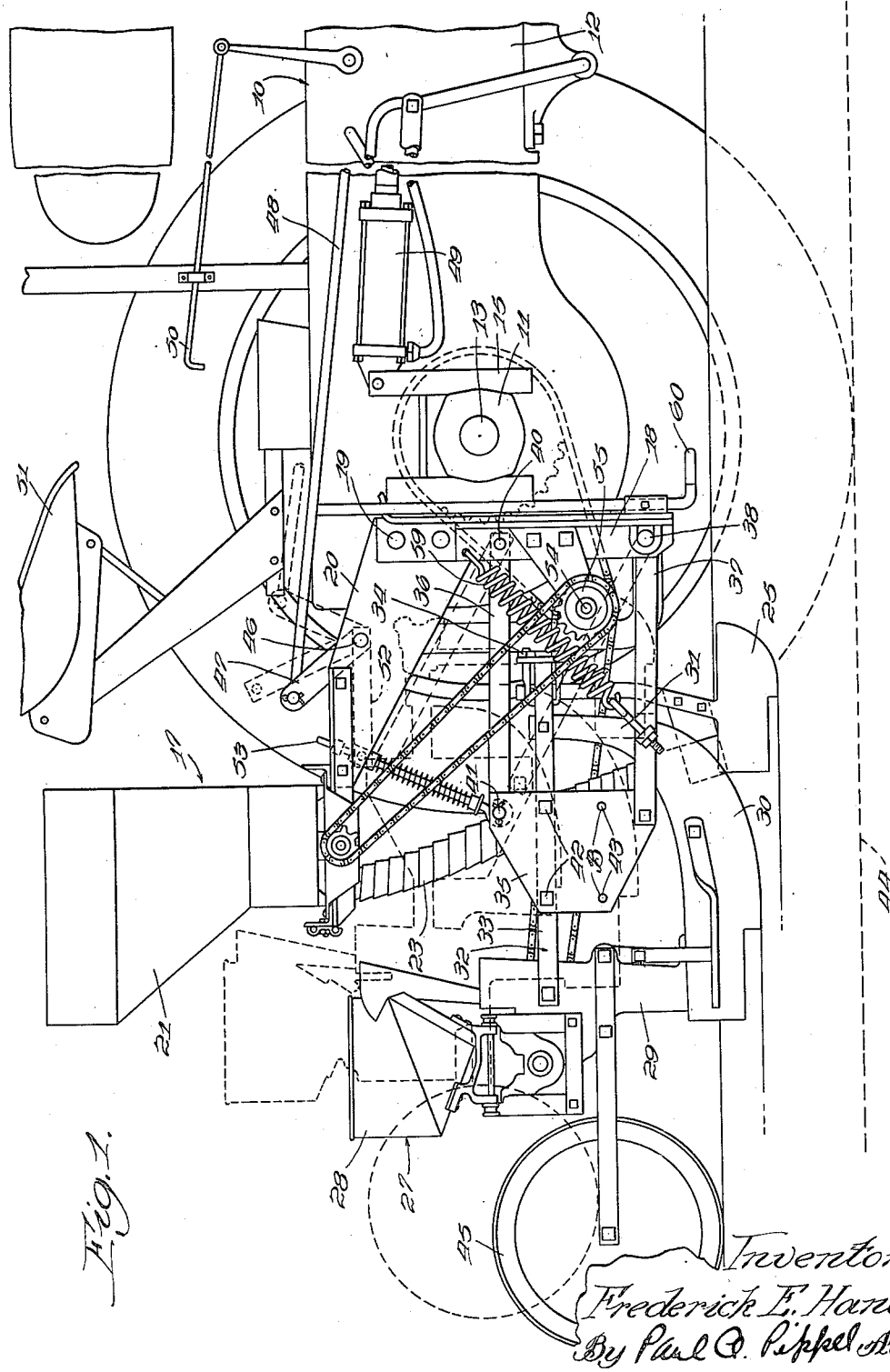
Figure 1 is an elevational view of the rear portion of a tractor with one wheel removed and showing the implement embodying features of the present invention attached thereto.
Figure 2:
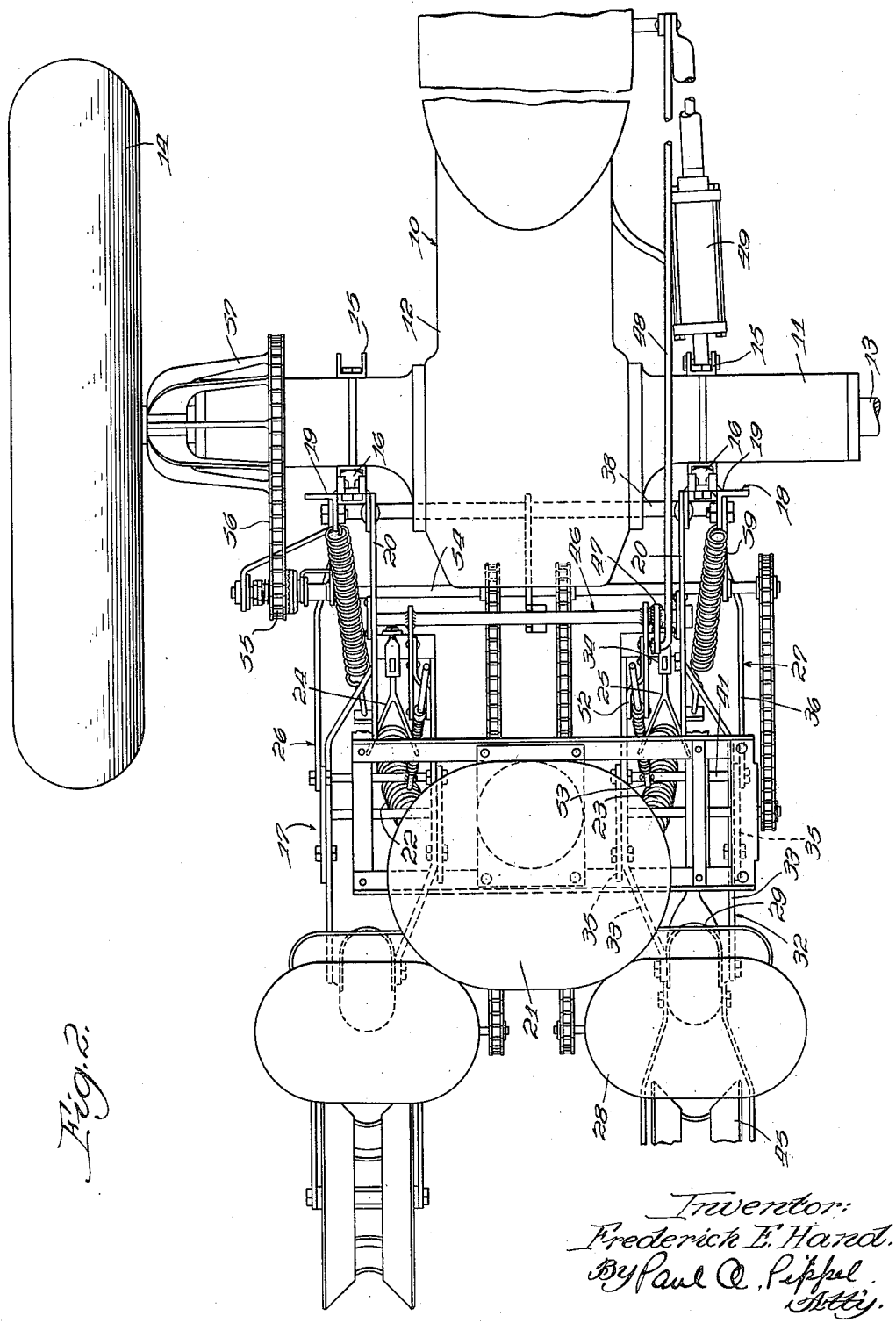
Figure 2 is a plan view of the rear portion of the tractor and of the implement.

Referring now particularly to Figures 1 and 2, there is shown a portion 10 of a tractor having a rear axle structure 11 extending transversely with respect to the body 12 of the tractor and through which extends a rear axle 13 adapted to drive the traction wheels 14 of the tractor. Laterally spaced on the rear axle structure of the tractor are the attaching portions 15. These attaching portions carry attaching bolts 16 which serve to clamp the implement rigidly to the tractor in a manner well known in the art.

Connected to these attaching portions 15 is the combined fertilizing and planting attachment 17 embodying the features of the present invention. This implement comprises a supporting frame indicated generally at 18 having vertically extending portions 19 adapted to cooperate with the clamping bolts 16 on the tractor-attaching portion 15 and a rearwardly extending portion 20 serving to support a fertilizer hopper structure 21. The hopper structure 21 is of a type adapted to be driven and has two delivery tubes 22 and 23 for delivering fertilizer, respectively, to the fertilizing spouts 24 and 25.

As viewed in Figure 4, it will be noted that the wheels 14 of the tractor are adapted to straddle a previously formed bed of considerable height. These beds are of a type such as used in Florida, on which beans and the like are planted. The beds are from 11 to 15 inches in height, and the wheels of the tractor straddle the same as the implement is carried along the length of the bed by the tractor.

Located at opposite sides of the supporting frame 18 and laterally of the common fertilizer hopper structure 21 are the planting structures 26 and 27. Since these planting structures are of similar design, description will be made of only one of the planting structures.

The planting structure 27 includes a seed hopper 28 adapted to be driven for the delivery of seeds to a vertically extending seed boot 29 supported on a runner 30 and forming part thereof. The runner 30 is turned up at its forward end, as indicated at 31, and is connected to a frame structure 32 comprised of longitudinally extending straps 33 connected at their forward ends to the portion 31 of the runner and at their rearward ends to the seed boot 29. This frame structure 32 also supports the seed hopper structure 28 and, at its forward end, a fertilizer boot 25 by means of a clamp 34. The straps 33 are, in turn, attached to laterally spaced plates 35, which are, in turn, connected to the supporting frame 18 by means of upper and lower parallel links 36 and 37. There is a pair of lower links 37 laterally spaced and respectively connected to the laterally spaced, vertically extending plates 35. These lower links are connected to the frame structure 18 by means of a transversely extending shaft 38 which extends the entire width of the implement for attachment to the supporting frame 18 of the planting structures at the opposite sides thereof. The links 37 are retained on the shaft 38 against lateral movement and for adjustment of the planting structures by means of set collars 39. The upper link 36 is pivoted to the supporting frame 18, as indicated at 40, and to the transversely spaced plates 35 by means of a transversely extending pin 41.

It will be noted that the straps 33 are connected to the respective plates 35 by the connecting bolts 42. The frame structure 32, carrying the runner and hopper, is a unit and is vertically adjustable, since it can be fastened to the plates 35 in a position indicated at B where the connecting bolts 42 would extend through the openings 43 in the plates 35. With this adjustment, the planting structures can be readily adapted for planting of beds of minimum height and of less height than the usual high beds in the ground or where no beds at all have been formed. This gives universality to the implement and at the same time provides an implement which is quickly attachable for planting on high, previously formed, beds, where the tractor wheels 14 follow in water furrows 44 at the side of the bed. Carried by the seed boot 18 is the usual covering and depth adjusting wheel 45.

On the rearwardly extending portion 20 is an auxiliary rockable lifting structure 46 having an arm 47 adapted for attachment by means of a link 48 to a hydraulic power lift device 49. The power lift device 49 receives fluid from a pump source within the body portion 12, controllable by a control rod 50, accessible to an operator's station 51 on the rear axle structure 11 of the tractor. When the power lift device 49 is extended, the rockable structure 46 will be rocked in a clockwise direction having arms 52 connected respectively with the shaft pins 41. By means of lift rods 53 the planting structures 26 and 27 will be raised to a transport position on the tractor, as indicated in dotted lines in Figure 1.

On the lower part of the supporting frame 18 is a transversely extending auxiliary drive shaft 54. This drive shaft 54 has a chain sprocket 55 adapted to receive power by means of a chain 56 from a power take-off driving gear 57 on the rear axle 13 of the tractor. To this auxiliary drive shaft is connected, by chain and sprockets, the fertilizer hopper structure 21 and the planting structures 26 and 27. The driving connections with these structures are such that they always remain connected when the implement is detached from the tractor.

To counterbalance the weight of the seed in the seed hopper devices 28, there is provided a spring means 59 connected between the lower link 37 and the vertically extending members 19 of the supporting frame 18. When the implement is detached from the tractor, the same is retained in its upright position by forward standards 60, and the rear standards 61 extend between the portion 20 and the planter frames 32.

It should now be apparent that there has been provided a self-contained fertilizer and planting implement which is attachable to the tractor as a unit and one which is particularly adaptable for the planting of seed on a previously prepared bed of considerable height. It should also be apparent that this planting implement can be used as well on beds of low height and on the level ground by a simple vertical adjustment of the planting frame with respect to its parallel link means for connecting the same to the supporting frame 18. Once the implement is attached to the tractor, the auxiliary lifting and driving devices need only be connected respectively to the power lift and take-off devices on the tractor.

While various changes may be made in the detail construction of the present invention, it should be understood that such changes are within the spirit and scope of the present invention as defined by the appended claims.

What is claimed is:

1. In combination, an implement-supporting structure having a power lift device, a power take-off driving device, and attaching portions for implements, a combined fertilizer and planting implement including a supporting frame with means for attaching the implement to the attaching portions of the implement-supporting structure, a fertilizer hopper structure carried by the supporting frame, a planting structure including a runner frame connected to the supporting frame for vertical movement, a fertilizer spout carried by the runner frame and adapted to receive fertilizer from the fertilizer hopper structure, auxiliary lifting means carried by the supporting frame and connected with the runner frame to move the same, said lifting means having means adapted for attachment thereto of the power lift device, and auxiliary drive shaft means carried by the supporting frame and connected respectively to the fertilizer and planting structures to drive the same and having means adapted to receive power from the power take-off driving device whereby said fertilizer and planting structures with the accompanying auxiliary means will be self-contained and adapted to be directly connected to the tractor as a unit.

2. In combination, a tractor having a power lift device, a power take-off driving device, and attaching portions for implements, a combined fertilizer and planting implement including a supporting frame with means for attaching the implement to the attaching portions of the implement-supporting structure, a fertilizer hopper structure carried by the supporting frame, a pair of planting structures including runner frames, parallel link means for respectively connecting the runner frames to the supporting frame for vertical movement, fertilizer spouts carried by the runner frames, means for delivering fertilizer from the fertilizer hopper structure to the fertilizer spouts, auxiliary lifting means carried by the supporting frame and connected with the runner frames to move the same, said lifting means having means adapted for attachment thereto of the power lift device, auxiliary drive shaft means carried by the supporting frame and connected respectively to the fertilizer and planting structures to drive the same and having means adapted to receive power from the power take-off driving device whereby said fertilizer and planting structures with the accompanying auxiliary means will be self-contained and adapted to be directly connected to the tractor as a unit.

3. In combination, an implement-supporting structure, an implement including a frame adapted to be directly connected to the implement-supporting structure and a longitudinally extending tool-supporting assembly pivotally connected with said frame to facilitate raising and lowering of a working tool thereon, means for connecting the implement frame to the implement-supporting structure, and means on the implement-supporting structure and operably connected with said assembly to pivot the same for vertically adjusting the tool thereon.

4. In combination, an implement-supporting structure, an implement adapted to be directly connected to the implement-supporting structure and including a frame, laterally spaced support members on said frame, a longitudinally extending tool-supporting assembly having a working tool thereon, means for connecting the tool-supporting assembly to the frame at a position between said laterally spaced attaching members for vertical movement with respect thereto, tool-lifting means upon and between said support members and manipulatable for vertically adjusting the tool-supporting assembly with respect to the connecting means, means for connecting the implement frame in supporting relation with the tool-supporting structure, and means on the tool-supporting structure for manipulating said tool-lifting means.

5. In combination, an implement-supporting structure, a planting implement adapted to be directly connected to the implement-supporting structure, and including a planter assembly having furrow opening tools attached thereto, parallel link means for connecting the planter assembly to the implement-supporting structure including laterally spaced vertically extending spaced plates, said planter assembly extending between the plates, and means cooperating between the plates and the planter assembly for vertically adjusting said assembly with respect to the connecting means.

6. In combination, an implement-supporting structure, a planting implement adapted to be connected to said implement-supporting structure and of a type particularly adaptable for planting on high previously prepared planting beds, said implement including a frame and a planting assembly having a furrow-opening tool attached thereto, means for connecting said implement frame in supporting relation on the implement-supporting structure, stabilizing means for connecting the planting assembly to the implement frame for vertical movement with respect thereto, and means for converting the implement from one adapted to plant on high beds to one adapted to plant in unbedded ground including means for vertically adjusting the planting frame assembly with respect to the stabilizing means.

7. In combination, an implement-supporting structure, a combined fertilizing and planting implement adapted to be connected to the implement-supporting structure and including a planting assembly having longitudinally extending frame members and a seed furrow-opening runner thereon, parallel link means for connecting the planting assembly to the implement-supporting structure for vertical movement with respect thereto, and laterally spaced vertically extending plates, said planting assembly extending between the plates, a fertilizing structure including a fertilizer furrow-opening tool carried by the frame members of the planting assembly, and means cooperating between the plates and the planting assembly for vertically adjusting said assembly and its associated tools with respect to the connecting means, whereby both the fertilizing and planting tools will be vertically adjustable.

FREDERICK E. HAND.